E. P. ORNER.
DEVICE FOR STRAIGHTENING SHEET METAL.
APPLICATION FILED SEPT. 11, 1919.

1,391,787.

Patented Sept. 27, 1921.
2 SHEETS—SHEET 1.

INVENTOR
ELMO P. ORNER

BY Hugh K. Wagner
ATTORNEY

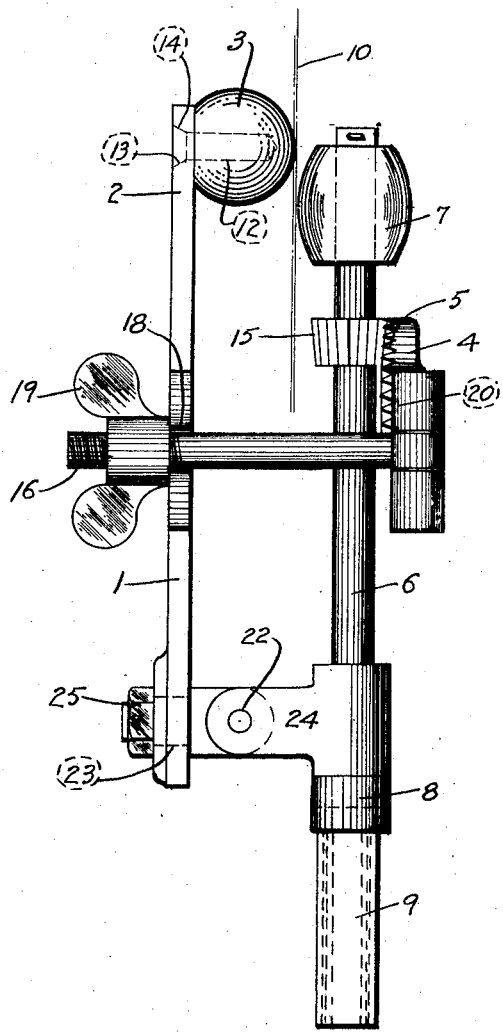

UNITED STATES PATENT OFFICE.

ELMO P. ORNER, OF ST. LOUIS, MISSOURI.

DEVICE FOR STRAIGHTENING SHEET METAL.

1,391,787. Specification of Letters Patent. Patented Sept. 27, 1921.

Application filed September 11, 1919. Serial No. 323,200.

*To all whom it may concern:*

Be it known that I, ELMO P. ORNER, a citizen of the United States, residing at the city of St. Louis, in the State of Missouri, have invented certain new and useful Improvements in Devices for Straightening Sheet Metal, of which the following is a specification.

This invention is a device for straightening sheet metal, and is more especially intended for the removal of bulges, dents, and other inequalities in the fenders and other sheet-metal parts of automobiles or the like damaged by accident.

In the accompanying drawings forming part of this specification, in which like numbers of reference denote like parts wherever they occur, Figure 1 is an end elevation;

Fig. 3 is a side elevation.

Figure 1:
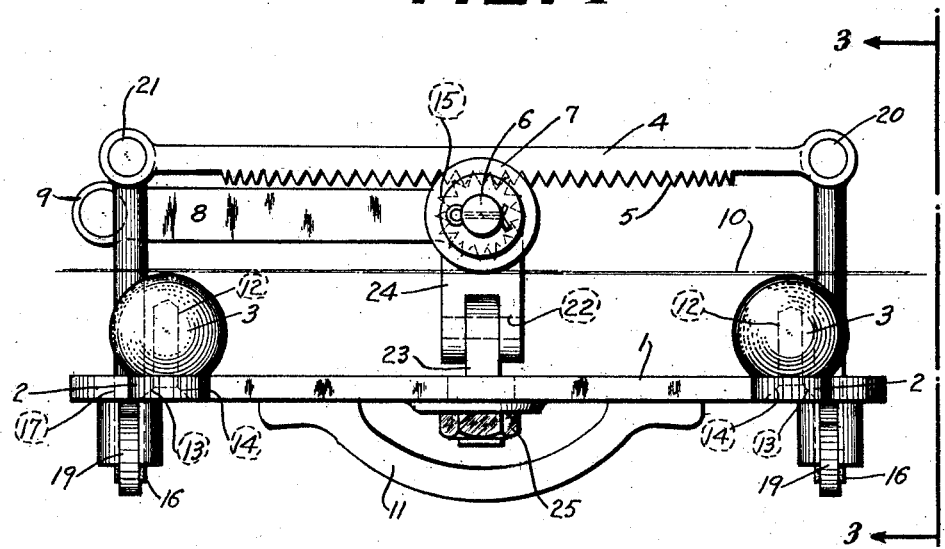

In its main aspects, this invention consists of a main body 1 having a pair of arms 2, from which depend loosely-mounted balls 3, and another member 4, in hinged relation to the body 1 and bearing the rack 5, and still another member consisting of a shaft 6, to which is fastened a roller 7, adapted to be rotated by the said shaft by revolution of crank 8, having handle 9.

In operation, as best seen in Fig. 3, the work 10 lies in a plane between balls 3 and roller 7. Balls 3 hold the work steady, and the rotation of roller 7 rolls it out, thus smoothing its surface. The device as a whole can be readily moved from place to place upon the piece of metal that is being worked, so that if there is more than one dent or rough place it can be straightened without difficulty. Furthermore, the device as a whole can be rapidly moved, so as to impart a regular and even surface by means of roller 7 to all adjacent parts of the work. Such handling of the device is facilitated by handle 11.

The balls 3 need not be of the precise shape shown in the drawings, but disks having operative peripheral edges can be substituted therefor. (Not shown in the drawings.)

Rolling travel is imparted to roller 7 by the meshing of pinion 15 with rack 5.

Figure 2:
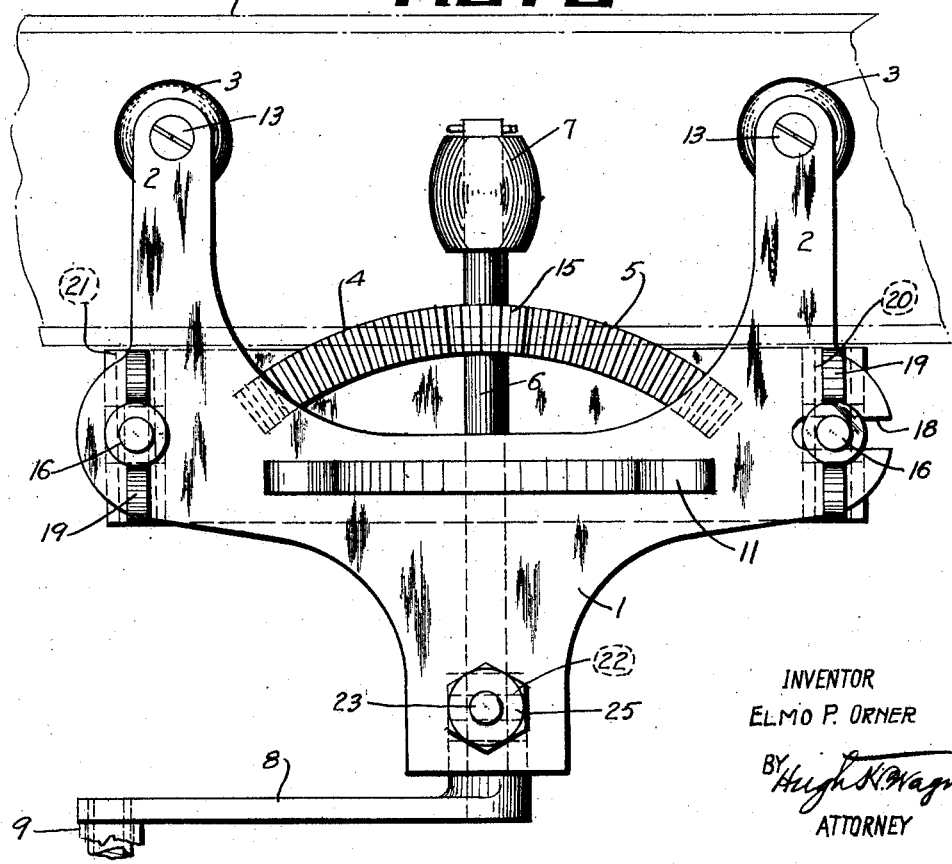
Fig. 2 is a top-plan view.

The member 4 bearing rack 5 is attached by screws 16 to body 1, one of the said screws passing through hole 17 and the other through slot 18 in body 1. Butterfly-nuts 19, threaded on screws 16, hold the said member 4 in the position shown in Fig. 1. By turning thumb-nut 19 on the screw 16 located in slot 18, member 4, which is hinged at 20 and 21 to screws 16, can be rotated on pivot 21, in order to allow separation or increase of space between roller 7 and the balls 3, so as to facilitate the introduction of the work 10 therebetween. After this has been done and the balls 3 are either below or above the work 10 and the roller 7 on the opposite side of the said work, the screw that fits into slot 18 can be drawn into place and butterfly-nut 19 applied thereto, so as to draw all the parts together taut. The position of the balls 3 and roller 7 relative to each other is well illustrated in Figs. 2 and 3, by which it will be seen that the roller 7 is about intermediate the balls 3, but adapted to be moved as it rotates from one of the said balls to the other between arms 2.

Shaft 6 is so attached to body 1 as to be in hinged connection therewith by means of pintle 22, which passes through screw 23 and the arms of fork 24. Pin 23 is held to body 1 by nut 25, but screw or pin 23 is free to rotate in body 1 and to allow shaft 6 to swing as pinion 15 travels on rack 5 and causes roller 7 to travel the arc of a circle described by rack 5. Roller 7 thus travels in either direction freely between arms 2.

Having thus described this invention, I hereby reserve the benefit of all changes in form, arrangement, order, or use of parts, as it is evident that many minor changes may be made therein without departing from the spirit of this invention or the scope of the following claims.

I claim:

1. The combination of a body-portion having arms, a rack-bearing member in hinged relation thereto, the said rack extending between the said arms, a swinging shaft bearing a pinion adapted to travel on the said rack, a work-roller upon the said shaft, and balls at approximately the extremities of the said arms, the said rack-bearing member being attached by screw members to the said body-portion and there being butterfly-nuts for such attachment and a slot in the said body-portion for one of the said screw-members.

2. The combination with a body portion having arms and movable members mounted on said arms of a rack bearing member having hinged connection at one end to the body portion, a removable connection between the other end of said rack bearing member and the body portion, a shaft having a swinging connection with the body portion, a movable member on said shaft, and a pinion arranged on the shaft and coöperating with the rack.

3. A metal straightening device comprising a body portion having spaced parallel arms terminally provided with rotatable metal engaging elements, a shaft carrying a metal engaging element, a mounting for said shaft hinged to the body portion, a pinion on said shaft, a segmental rack arranged to engage the pinion, rods pivotally connected to said rack, said rods extending through the body portion, and means on the rods beyond the body portion to adjust the rods relative to the body portion.

In testimony whereof I hereunto affix my signature.

ELMO P. ORNER.